(12) United States Patent
Yamada

(10) Patent No.: US 7,059,679 B2
(45) Date of Patent: Jun. 13, 2006

(54) SEAT DEVICE

(75) Inventor: Yukifumi Yamada, Toyota (JP)

(73) Assignee: Aisin Seiki Kabushiki Kaisha, Kariya (JP)

( * ) Notice: Subject to any disclaimer, the term of this patent is extended or adjusted under 35 U.S.C. 154(b) by 19 days.

(21) Appl. No.: 10/890,293

(22) Filed: Jul. 14, 2004

(65) Prior Publication Data

US 2005/0029851 A1 Feb. 10, 2005

(30) Foreign Application Priority Data

Jul. 23, 2003 (JP) ............... 2003-200565

(51) Int. Cl.
B60N 2/06 (2006.01)
(52) U.S. Cl. ............... 297/341; 297/344.1; 297/378.12
(58) Field of Classification Search ............. 297/344.1, 297/378.12, 341; 296/65.13
See application file for complete search history.

(56) References Cited

U.S. PATENT DOCUMENTS 5,683,140 A * 11/1997 Roth et al. ............... 297/344.1
6,152,533 A * 11/2000 Smuk ...................... 297/341 X
6,336,679 B1 * 1/2002 Smuk ...................... 297/378.12

FOREIGN PATENT DOCUMENTS

JP 3284901 8/2002

* cited by examiner

Primary Examiner—Anthony D. Barfield
(74) Attorney, Agent, or Firm—Finnegan, Henderson, Farabow, Garrett & Dunner, LLP

(57) ABSTRACT

A seat device includes a seat movable between a seating state and a non-seating state, a sliding device for adjusting the seat to a position in a seating range where the seat becomes the seating state and in a non-seating range where the seat becomes the non-seating state, the sliding device having an upper rail fixed to the seat and a lower rail fixed to a floor for slidably supporting the upper rail, a contacting member provided on the lower rail over the range corresponding to the non-seating range of the seat, an actuating mechanism actuated by contacting with the contacting member while the seat is positioned in the non-seating range, and an actuated mechanism to be actuated cooperating with the actuating mechanism in order that the seat becomes the non-seating state.

7 Claims, 3 Drawing Sheets

US 7,059,679 B2

SEAT DEVICE

CROSS REFERENCE TO RELATED APPLICATIONS

This application is based on and claims priority under 35 U.S.C. § 119 to Japanese Patent Application 2003-200565, filed on Jul. 23, 2003, the entire content of which is incorporated herein by reference.

FIELD OF THE INVENTION

This invention generally relates to a seat device for a vehicle. More particularly, this invention pertains to a seat device structured that a fore-aft direction of a seat position is adjustable relative to a vehicle floor.

BACKGROUND

In a known seat device, a seat position is adjustable in a fore-aft direction relative to a vehicle floor by an operation of a seat sliding device for using a space in a vehicle room for various purposes, for example, for accommodating occupants, or loading luggage. Normally, the seat position in a fore-aft direction is divided into a seating range and a non-seating range. The seating range is defined that a seat is moved to a rear part of the vehicle room and an occupant can sit down on the seat. The non-seating range is defined that the seat is moved forward to extend a loading space for luggage. When the seat is at the seating range, a position of a seat belt attached to a vehicle body and a position of the occupant is set properly, and a seatback is set at a proper space around the occupant. Meanwhile, when the seat is positioned at the non-seating range, the seatback or a seat cushion is folded for the occupant not to sit down on the seatback or the seat cushion. Thus, the occupant is protected from improper use of the seat at a position where the occupant can not use the seat belt properly. The known seat device is described, for example, in Japanese Patent Publication No. 3284901.

In order to achieve the function stated above, the known seat device includes a stopper mechanism which is configured to be released when a seat cushion is tipped up so that an occupant can not sit down on, to move the seat from a seating range to a non-seating range. However, when the occupant is not accustomed to an operation of the seat device, and improperly moves the seat for loading the luggage without tipping the seat cushion up, the stopper mechanism likely to be broken by an applied heavy load. The stopper mechanism has to be strong not to be broken down, which makes the stopper mechanism large and costly. Further, a complex mechanism is required to return a state of the stopper mechanism when the seat is returned to the seating range.

A need thus exists for a seat device structured simple, and structured that a heavy load is not applied when a seat is moved from a seating range to a non-seating range.

SUMMARY OF THE INVENTION

According to aspect of the present invention, a seat device includes a seat movable between a seating state and a non-seating state, a sliding device for adjusting the seat to a position in a seating range where the seat becomes the seating state and in a non-seating range where the seat becomes the non-seating state, the sliding device having an upper rail fixed to the seat and a lower rail fixed to a floor for slidably supporting the upper rail, a contacting member provided on the lower rail over the range corresponding to the non-seating range of the seat, an actuating mechanism actuated by contacting with the contacting member while the seat is positioned in the non-seating range, and an actuated mechanism to be actuated cooperating with the actuating mechanism in order that the seat becomes a non-seating state.

BRIEF DESCRIPTION OF THE DRAWINGS

The foregoing and additional features and characteristics of the present invention will become more apparent from the following detailed description considered with reference to the accompanying drawings, wherein.

DETAILED DESCRIPTION OF THE PREFERRED EMBODIMENT

One embodiment of the present invention will be explained with reference to FIG. 1–4 as follows.

Figure 2:
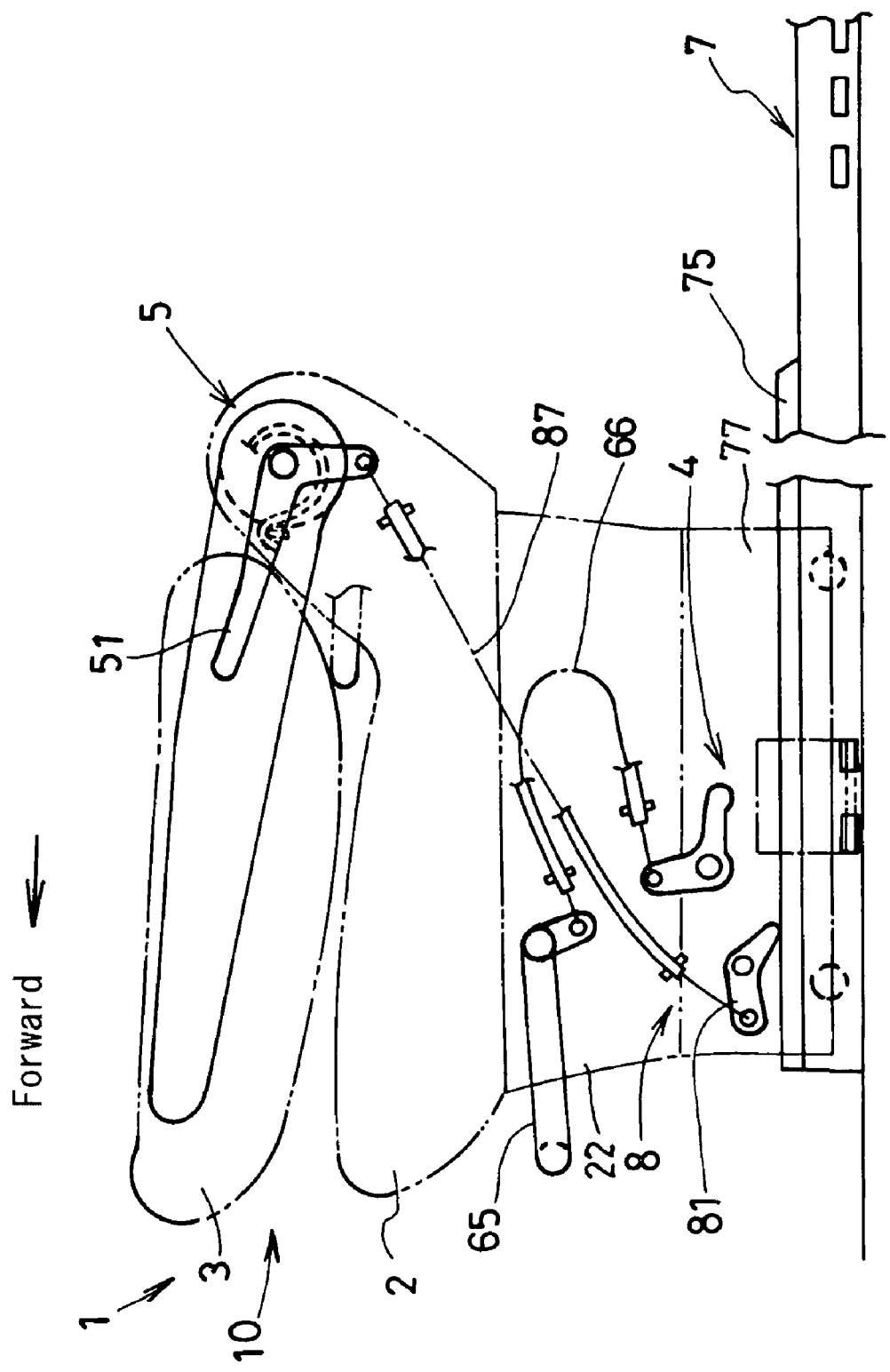
FIG. 2 shows a side view of the seat device at non-seating range that a seat back of the seat device is folded on a seat cushion.
Figure 3:
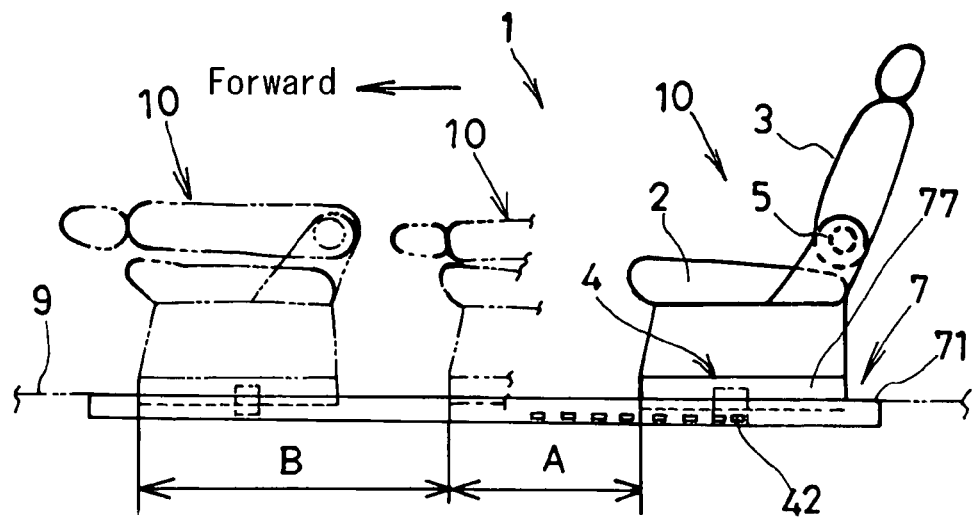
FIG. 3 shows a side view of an actuation area of the seat device according to the invention.

As shown in FIG. 3, a seat device 1 includes a seat 10. A position of the seat 10 is adjustable in a fore-aft direction (side to side direction in FIG. 3) by an elongated seat sliding device 7 attached on a vehicle floor 9. The position of the seat 10 is adjustable finely stepwise in an area A (shown in FIG. 3) by an operation of a locking device 4 provided at the seat sliding device 7 and multiple, equally spaced locking holes 42. Meanwhile, in case the seat 10 is moved to an area B located forward from the area A, a seatback 3 is automatically reclined on a seat cushion 2 (shown with two-dotted lines in FIG. 2), and the seat device 1 becomes a non-seating state. Thus, with the seat device 1, the area A is defined as a seating range, and the area B is defined as a non-seating range. The seat device 1 is structured that the area A and the area B are clearly distinguished and selectively used as the seating range and the non-seating range respectively.

Figure 1:
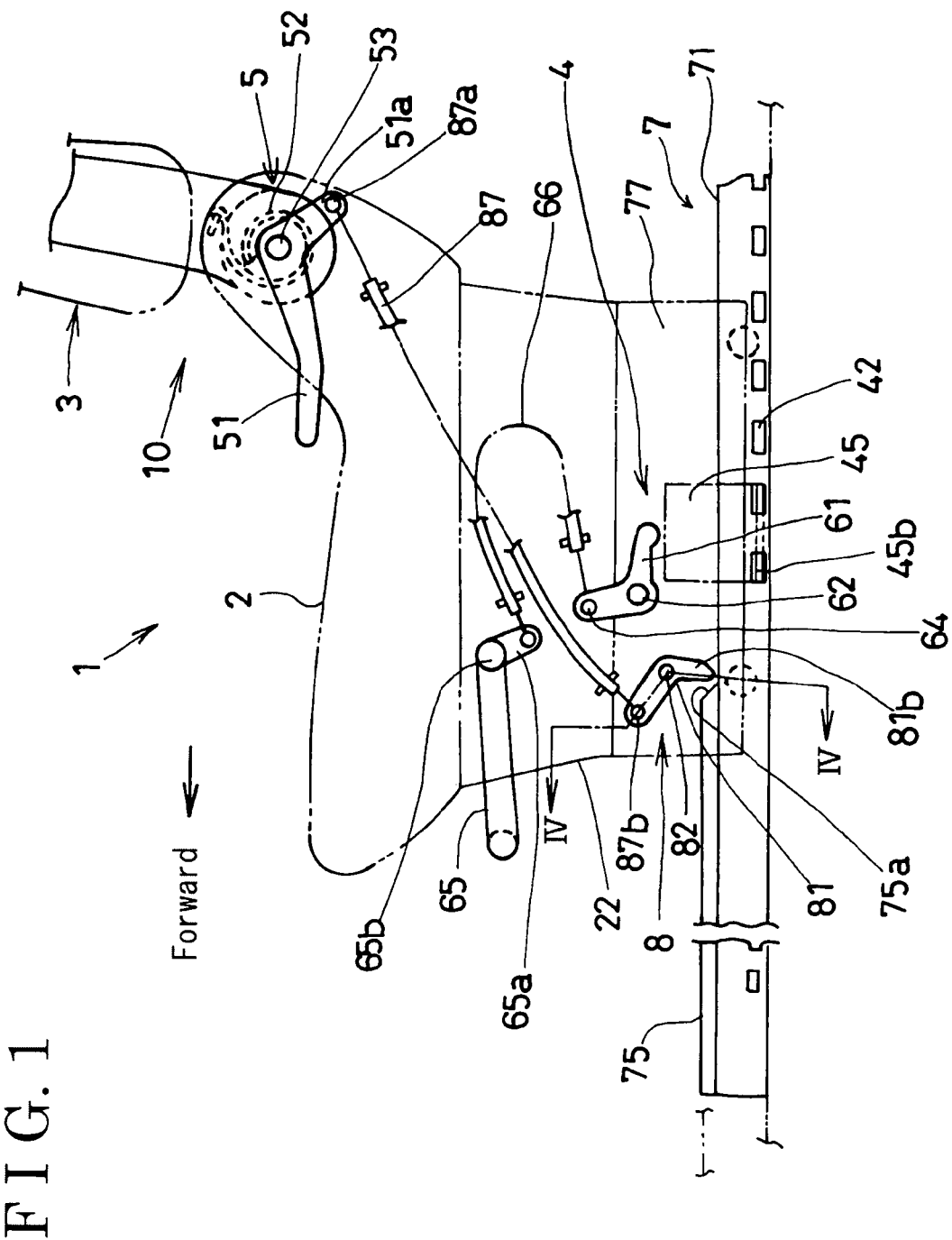
FIG. 1 shows a side view of a seat device positioned at a seating range according to the invention.
Figure 4:
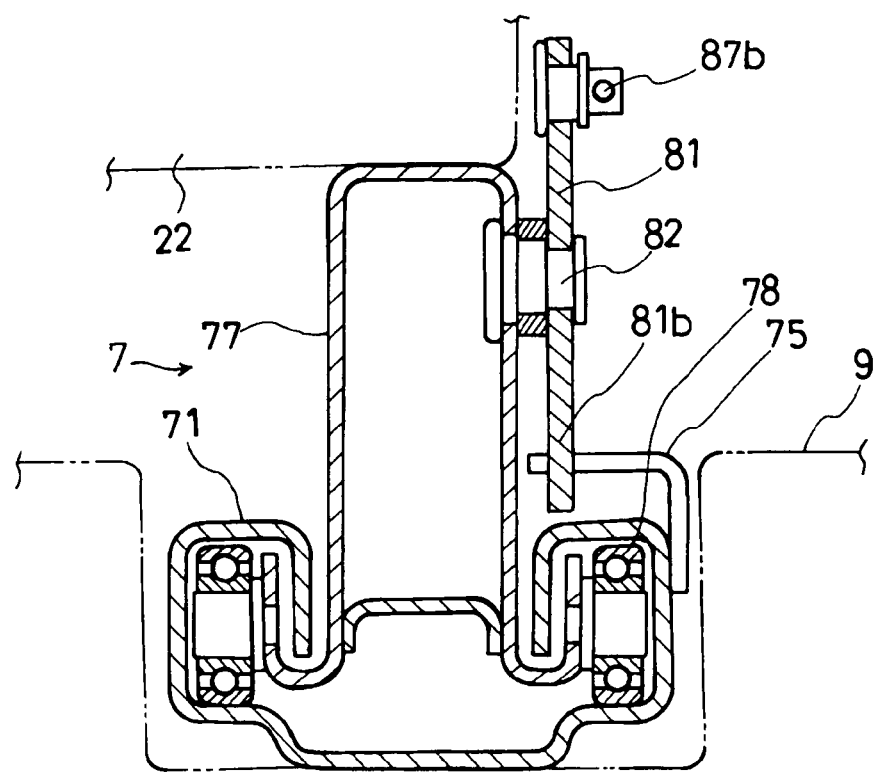
FIG. 4 shows a cross-sectional view taken on line IV—IV of FIG. 1.

As shown in FIG. 1–2 and FIG. 4, the seat 10 is supported by a known reclining mechanism 5 (an actuated mechanism) to adjust a reclining angle of the seatback 3 serving as a backrest relative to the seat cushion 2 serving as a seating portion. The reclining mechanism 5 includes an operating lever 51 for releasing an embedded lock mechanism to adjust the reclining angle of the seatback 3. With this structure, a lock of the reclining mechanism 5 is released by clockwise rotational operation of the actuating lever 51 (shown in FIG. 1). The seatback 3 is biased for reclining forward of the seat 10 by a biasing force of a return spring 52 included at the reclining mechanism 5. Then, when the seat back 3 leans forward at the largest reclining angle, the seat back 3 becomes a folded state that the seat back 3 is folded on the seat cushion 2 as shown in FIG. 2.

The seat 10 is provided on an upper surface of an upper rail 77 of the seat sliding device 7 via a seat base portion 22. The upper rail 77 of the seat sliding device 7 is slidably supported at a lower rail 71 fixed at the floor 9 (shown in FIG. 4) via rollers 78 (shown in FIG. 4). Further, the locking device 4 is included in the seat sliding device 7 for locking or releasing the lock of the upper rail 77 relative to the lower rail 71.

As shown in FIG. 1–2, the locking device 4 of the seat sliding device 7 includes a locking lever 45. The locking lever 45 is rotatably attached in a direction of a seat width (i.e., perpendicular to FIG. 1–2) by a bracket fixed at a side wall portion of the upper rail 77. Further, a stopping nail portion 45b formed at a lower end of the locking lever 45 is structured to engage with the locking hole 42 provided at a side wall portion of the lower rail 71. The locking lever 45 is biased by spring means so that the stopping nail portion 45b always engages with the locking hole 42. Then a movement of the upper rail 77 relative to the lower rail 71 is restricted with this structure.

As shown in FIG. 1–2, the locking mechanism 4 includes a releasing lever 61 for rotating the locking lever 45 toward a releasing direction of the locking mechanism 4. The releasing lever 61 corresponds to a flat plate link having approximate L character shape. A center portion of the releasing lever 61 is rotatably attached at a side surface of the upper rail 77 about a rotational axis 62. A connecting pin 64 is attached at an upper end of the releasing lever 61. A first end of a sliding cable 66 is connected at the connecting pin 64.

As shown in FIG. 1–2, an operating lever 65 is rotatably attached at a rotating portion 65b of the operating lever 65 relative to the seat base portion 22. A second end of the sliding cable 66 is connected to an end portion of a connecting portion 65a projected at a lower portion of the operating lever 65. When the operating lever 65 is rotated clockwise in FIG. 1, the sliding cable 66 is pulled. Normally, the operating lever 65 is biased counterclockwise in FIG. 1 by spring means. When an end of the operating lever 65 horizontally extended forward is lifted against a biasing force by the spring means, and is rotated clockwise, the sliding cable 66 is pulled, and the releasing lever 61 rotates clockwise. Then, the releasing lever 61 pushes the locking lever 45 downward and rotates the locking lever 45. As a result, the stopping nail portion 45b of the locking lever 45 is removed from the locking hole 42, and a lock of the locking mechanism 4 is released.

As shown in FIG. 1–2, the operating lever 51 of the reclining mechanism 5 for adjusting the reclining angle of the seatback 3 is rotatably supported about a rotational axis 53 of the reclining mechanism 5. The operating lever 51 includes an extended portion 51a extended downward from the rotational axis 53. A reclining releasing mechanism 8 (an actuating mechanism) includes an actuating lever 81 (an actuating member), a reclining releasing cable 87, a rotational axis 82. A first end 87a of the reclining releasing cable 87 is connected at a lower end of the extended portion 51a. A second end 87b (a connected point 87b) of the reclining releasing cable 87 is connected to an upper end of the actuating lever 81 (actuating member) attached at the upper rail 77 via the rotational axis 82. The actuating lever 81 includes an extended portion 81b extended downward and positioned at an opposite side of the connected point 87b connected with the reclining releasing cable 87 about the rotational axis 82. A lower end of the extended portion 81b contacts a contacting member 75 attached at the lower rail 71.

The contacting member 75 contacts the lower end of the extended portion 81b to rotate the actuating lever 81 counterclockwise as shown in FIG. 2 in case the position of the seat 10 is in the non-seating area shown as the area B. Then, the reclining releasing cable 87 is pulled, and the operating lever 51 is rotated clockwise to release the lock of the reclining mechanism 5. A range of a length of the contacting member 75 corresponds to a length of the area B, in other words the non-seating range of the seat 10. Thus, in the non-seating range, the lock of the reclining mechanism 5 is maintained at the released state. An inclined plane 75a is formed at an end of the contacting member 75 for smooth start of contact with the actuating lever 81.

An operation of the seat device 1 stated above is explained as follows.

In order to enlarge a loading space by moving the seat 10 in the seating range forward, the operating lever 65 of the seat sliding device 7 is lifted, then the locking device 4 is released, and the seat 10 can be moved forward. During a process that the seat 10 is moved forward, when the seat 10 becomes to be positioned at the area B, in other words the non-seating position, the approximate V character shaped actuating lever 81 contacts the contacting member 75 and is rotated by the contacting member 75, the lock of the reclining mechanism 5 is released, the seatback 3 is biased to rotate forward by the return spring 52, the seatback 3 is rotated forward and positioned on the seat cushion 2. Thus, the seat device 1 becomes the folded state, in other words, the non-seating position that an occupant cannot sit on the seat 10. The seat 10 at the non-seating position may be locked by the locking hole 42 provided at the seat sliding device 7 corresponding to a position that the seat 10 is moved most forward. When the seat 10 is returned to the seating range, and the seatback 3 is lifted to be upright, the seat 10 becomes a seating state again.

In the embodiment, the reclining mechanism 5 is utilized as a mechanism to be actuated to provide the non-seating position of the seat 10. However, the actuated mechanism is not restricted to the reclining mechanism 5. For example, the mechanism to be actuated may include the construction for tipping the seat cushion 2 up, and an interfering member positioned to interfere sitting, or the like.

As stated above, the seat device 1 in the present invention is structured with small number of components to make the seat 10 not to be sat down when the seat 10 is positioned at the non-seating area. Because the seatback 3 is automatically folded on the seat cushion 2 when the seat 10 is moved from the seating area to the non-seating area, a heavy load is not applied to the components even if an unaccustomed operator operates the seat device 1. In addition, the components are made to be compact.

The principles, preferred embodiment and mode of operation of the present invention have been described in the foregoing specification. However, the invention which is intended to be protected is not to be construed as limited to the particular embodiment disclosed. Further, the embodiments described herein are to be regarded as illustrative rather than restrictive. Variations and changes may be made by others, and equivalents employed, without departing from the spirit of the present invention. Accordingly, it is expressly intended that all such variations, changes and equivalents which fall within the spirit and scope of the present invention as defined in the claims, be embraced thereby.

The invention claimed is:

1. A seat device comprising:
   a seat including a seat cushion to seat an occupant and a seatback rotatably connected relative to the seat cushion, the seat movable between a seating state and a non-seating state;

a sliding device for adjusting the seat to a position in a seating range where the seat becomes the seating state and in a non-seating range where the seat becomes the non-seating state;

the sliding device having an upper rail fixed to the seat and a lower rail fixed to a floor for slidably supporting the upper rail;

a contacting member provided on the lower rail over the range corresponding to the non-seating range of the seat;

an actuating mechanism for making contact with the contacting member as the upper rail is slidably moved to the non-seating range, the actuating mechanism actuated by contacting with the contacting member while the seat is positioned in the non-seating range; and an actuated mechanism, which includes a reclining device for adjusting the angle of the seatback relative to the seat cushion, moved with the upper rail and actuated cooperating with the actuating mechanism for unlocking a lock of the reclining device in order that the seat becomes the non-seating state.

2. The seat device according to claim 1, further comprising:

a cable that is disposed between the actuating mechanism and the actuated mechanism.

3. The seat device according to claim 1, further comprising:

a locking device for enabling the seat device in a lock position to the floor.

4. The seat device according to claim 3, wherein the locking device is operated by an operating lever that is pivotally mounted on the seat device.

5. The seat device according to claim 4, wherein a cable is disposed between the operating lever and the locking device.

6. The seat device according to claim 1, wherein the non-seating range is relatively longer than the seating range.

7. The seat device according to claim 5, wherein the locking device is operated independently of the actuating mechanism.

* * * * *